United States Patent [19]

Fabbri

[11] Patent Number: 4,773,314
[45] Date of Patent: Sep. 27, 1988

[54] FERMENTATION OR MACERATION TANK WITH MOBILE EXTRACTOR

[76] Inventor: Frederic Fabbri, Avenue Victor Hugo-84320, Entraigues-Sur-Sorgues, France

[21] Appl. No.: 83,343

[22] Filed: Aug. 10, 1987

[30] Foreign Application Priority Data

Aug. 8, 1986 [FR] France .................. 86 11610

[51] Int. Cl.$^4$ ............................................. C12G 1/02
[52] U.S. Cl. ............................ 99/277.2; 241/46.17; 366/314
[58] Field of Search .................. 99/277.1, 277.2, 277, 99/276, 278; 426/478, 489, 11, 12; 241/101.7, 46 R, 46.17; 366/331, 314, 205, 279

[56] References Cited

U.S. PATENT DOCUMENTS 2,096,597 10/1937 Seabrooks .................. 366/331
3,510,000 5/1970 Carlson .................. 241/46.17
3,547,413 12/1970 Nunlist .................. 99/277.2
4,121,810 10/1978 Lui et al. .................. 366/331

Primary Examiner—Robert W. Jenkins
Attorney, Agent, or Firm—Sughrue, Mion, Zinn, Macpeak & Seas

[57] ABSTRACT

A fermentation tank for use in the agricultural and food industry sector, and particularly for viticulture is provided at its bottom with a side opening (4) that communicates with a box (3) that permits the introduction of the arm (13) of a mobile extractor. The arm (13) carries a rotary blade (23) that gathers solid deposits and to discharge them through an opening (12). During the fermentation process, the box (3) is covered with a removable grid (10) that prevents solid deposits entering the box. An opening (7) at the box base (3) provides for the discharge of liquids.

7 Claims, 2 Drawing Sheets

4,773,314

FERMENTATION OR MACERATION TANK WITH MOBILE EXTRACTOR

FIELD OF THE INVENTION

This invention refers to a fermentation or maceration tank used in the agricultural and food industry sector for grapes fermentation or maceration.

BACKGROUND OF THE INVENTION

Tanks are conventionally metal or plastic material casks, in vertical or upright position. The emptying of said tanks requires the removal of drained solid matters after they have been separated from liquid juices.

In order to remove drained solid matters from the tank, an opening is provided at the base of the tank so that a suitable tool can be introduced in order to gather deposits and remove them.

It was also proposed in the previous art to provide a blade at the base of the tank, the diameter of which would be sustantially the same as the tank diameter, said blade being rotated by an electric motor attached to the bottom of the tank.

After emptying the liquid juice, the blade is rotated at low speed in order to bring together all solid deposits and to force them through an opening at the base of the tank.

The profile section of blades is selected so that deposits are concentrated on a sweeping ring close to the opening provided for removal.

However it is difficult to achieve a satisfactory tightness of the driving shaft. Moreover this type of equipment installed on tanks represents high investment and maintenance charges when the user has several tanks.

SUMMARY OF THE INVENTION

The tank according to the invention eliminates the above-mentioned drawbacks. In fact, this tank is designed so that it can receive a mobile extractor at its base to accomplish the emptying operations. It is obvious that one extractor can be used for several tanks. It consists of an arm provided with a blade the rotating motion of which is driven by a motor assembly comprising an electric motor and a reduction gear. Transmission is through a transmission chain or shaft. The arm is mounted to a truck and its height may be varied.

Both arm and blade are introduced into the tank after the liquid has been emptied through a side opening at the bottom. At the introduction stage, the blade is locked in a parallel position to the arm. The tank is designed provided with a bottom provided with a downward extension in form of a parallelepiped box arranged symmatrically with the bottom diameter.

This box permits to introduce the arm in order to remove solid deposits. It comprises guide means which cooperate with the upper horizontal arm wall forming a sealed plate for the bottom of the tank.

During the fermentation or maceration process, the side opening in the tank that communicates with the box is sealed by a tight extraction door.

The slot opened in the bottom of the tank in the vicinity of the box is covered with a grid in order to prevent solid matters to enter the box.

When the fermentation or maceration process is completed, the liquid is extracted through an opening in the bottom of the box. The extraction door is opened so that the extraction arm and the blade can be introduced. The grid is removed by sliding it through the door and the blade is rotated. The blade configuration matches the bottom of the tank, its rotation helps gather deposits and discharge them through a discharge hole provided at the bottom of the tank. The sealing plate prevents deposits to enter the box. The blade is restored to its parallel position with the arm, is removed and the extractor is free for emptying another tank.

BRIEF DESCRIPTION OF THE DRAWINGS

Other advantages and forms of embodiment will appear from the description illustrated by the drawings where.

DESCRIPTION OF THE PREFERRED EMBODIMENT

Figure 1:
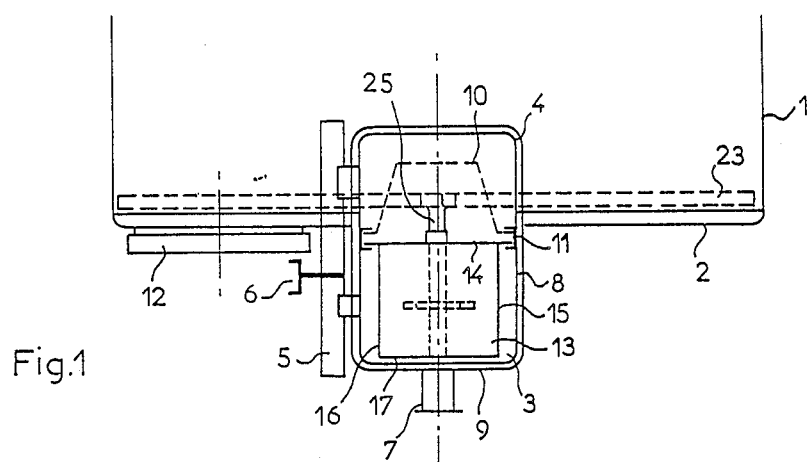
FIG. 1 is a front view of the tank with the extractor arm in position.
Figure 2:
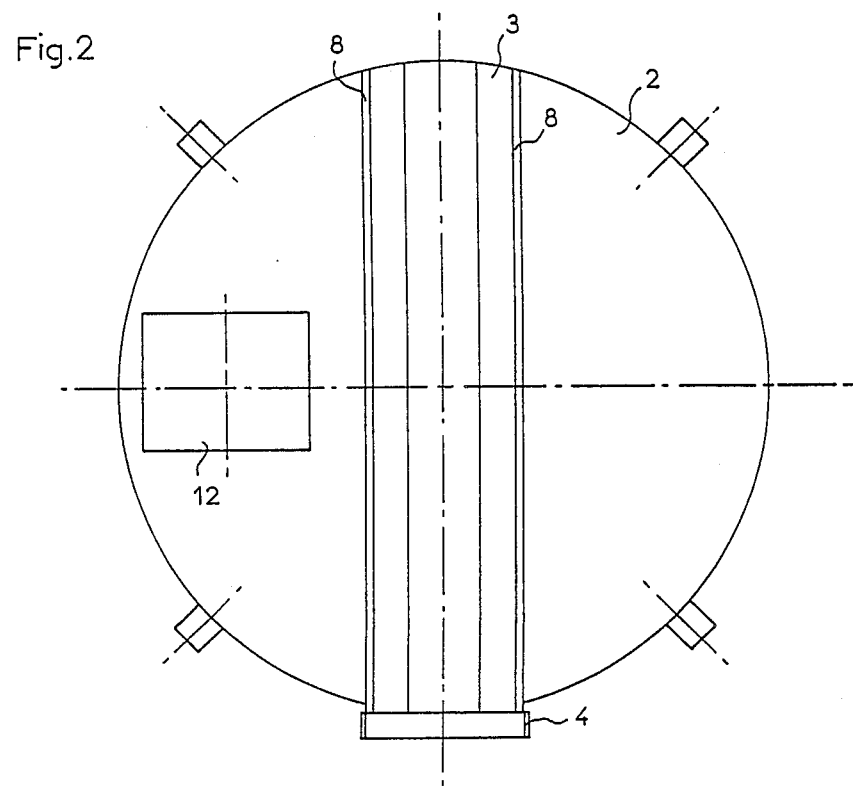
FIG. 2 is a top view of the tank bottom.

The tank shown in FIG. 1 or in FIG. 2 comprises a vertical cask (1), preferably of cylindrical configuration, with a bottom (2) and a box extension (3). In the lower portion of the tank, a side opening (4) is in communication with the box (3). The side opening can be closed tightly via a door (5) comprising locking means (6) of known design. The box (3) comprises a liquid discharge opening (7) with a control tap and guiding slides (8) installed slightly under the tank bottom (2).

The profile of the box (3) can be rectangular or semi-circular. It must be sized adequately in order to accommodate the extractor arm and the lower portion must be concave enough to allow the liquid to be discharged through the opening (7).

During the fermentation or maceration process, the top portion of the box is covered by a grid (10) that prevents solid deposits to enter the box. This grid may be a metal or a plastic material structure, it may comprise approximately 2.5 mm wide and 20 mm long perforations, or it may consist of parallel laths that are juxtaposed in the longitudinal direction of the box.

The grid (10) can be installed above the box (3) and removed in longitudinal motion owing to slides (11). An opening for discharging solid matters (12) is provided at the tank bottom (2). During the fermentation or maceration process, this opening is closed by a tight door of a type known in the trade.

Figure 3:
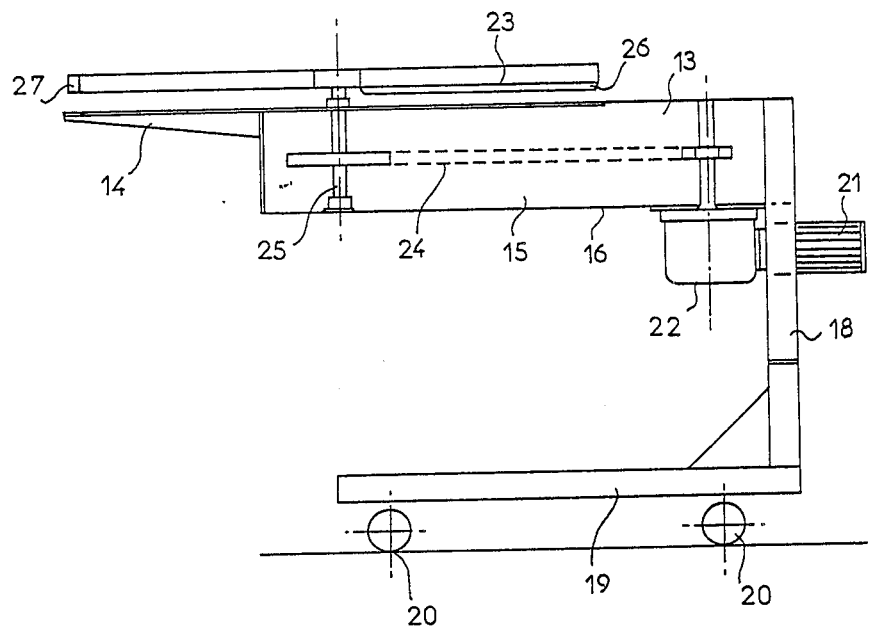
FIGS. 3 and 4 show the extractor.

The extractor shown in FIG. 3 comprises an arm (13) made of a sealing plate (14) and side walls (15,16 and 17). The arm (13) is attached to a frame (18) that can be height-adjusted by known means, for instance a rack.

Figure 4:
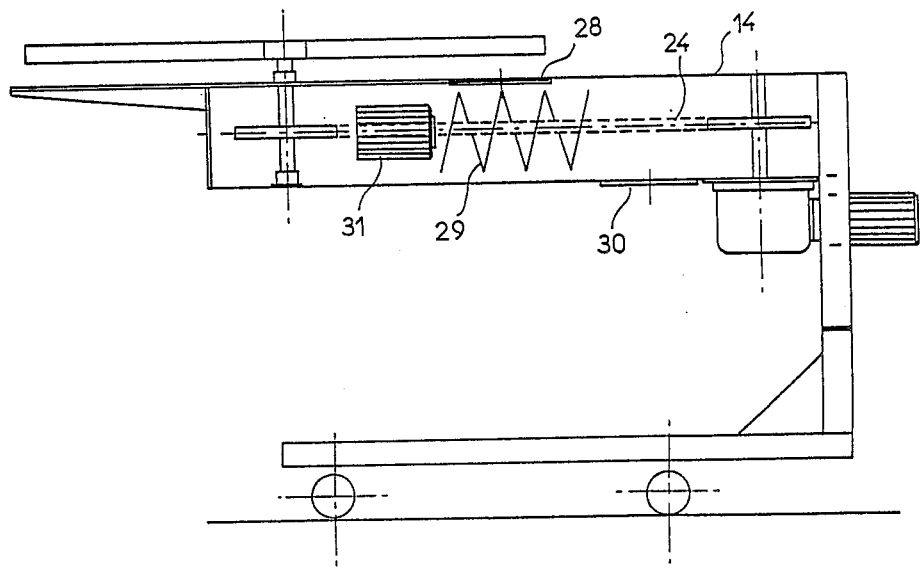

The extractor shown in FIG. 4 is a variation of the above-described one, where the discharge opening (12) has been omitted at the tank bottom (2) and is replaced on the sealing plate (14) and in the vicinity of the box (3) by an opening (28); solid matters falling in this opening are moved by an endless screw (29) driven by a gear motor and are discharged through an opening (30) to outside. In this alternative embodiment, the transmission (24) length is the same as the box inner length (3), in order to allow clearance for the endless screw (29).

The frame (18) comprises a mounting plate (19) fitted on castor wheels (20).

The frame (18) also carries a driving assembly consisting of an electric motor (21) and a reduction gear (22) that drives the blade (23) at a rotation speed ranging from 1 to 20 r.p.m., through a transmission (24)

comprising a transmission chain or shaft. The blade (23) is attached to a vertical shaft (25).

The sealing plate (14) is precision fitted with the box (3) side slides (8), in order to prevent solid deposits to enter the box.

The blade profile may be straight or alternatively it may be concave in the direction of the rotation in order to concentrate deposits in a sweeping ring above the solid matter discharge opening (12). The blade diameter is substantially equal to the tank (1) diameter. The blade is made of metal elements. Blade edges (26 and 27) can be coated with a band of flexible material such as rubber suitable for compensating any existing lack of smoothness on tank and bottom surface.

According to another form of embodiment, the shaft (25) is provided with a position sensor (not shown) that permits locking of the blade (23) in a position in parallel with the arm (13). This sensor may be electromagnet or optoelectronic controlled, it stops the electric motor when the user wants to remove the extractor from the tank.

According to another form of embodiment yet, the base of the extractor receives a receptacle (not shown) where solid matters discharged through the opening (12) can be collected.

The invention is of course not restricted to the forms of embodiment just described and shown here but a number of modifications can be made without departing from the intent of the invention.

I claim:

1. In a fermentation or maceration tank consisting of a vertical cask (1) having discharge openings for liquid substances (7) and for solid matters (12) at a lower portion (2) thereof, the improvement wherein said tank includes a side opening (4) and a box (3) and said tank further comprises a mobile extractor for the removal of solid deposits said mobile extractor comprising a horizontal arm (13), a rotating blade (23) carried by said arm, a driving means (24) for rotating said blade mounted for introduction into the lower portion (2) of the tank via said side opening (4) and ensuring a partial communication with said box (3).

2. Tank according to claim 1 wherein said extractor includes a sealing plate (14) and said box (3) comprises slides (8) engaging the sealing plate (14) of the extractor.

3. Tank according to claim 1, wherein the box (3) is covered with a removable grid (10).

4. Extractor for use in connection with a fermentation or maceration tank consisting of a vertical cask (1) having discharge openings for liquid substances (7) and for solid matters (12) at a lower portion (2) thereof and wherein the tank includes a side opening (4) and a box (3), said extractor comprising a frame (18) attached to a mobile base (19), a horizontal arm mounted to said frame, a rotating blade (23) carried by said arm, driving means operatively coupled to said blade for rotating said blade (24), said extractor arm being introduced into the lower portion of the tank via said side opening (4) and insuring a partial communication with said box (3).

5. Extractor according to claim 4, wherein the base (19) carries a receptacle for collecting solid deposits.

6. Extractor according to claim 4 wherein said driving means comprises chain driving means for rotating said blade.

7. Extractor according to claim 4, wherein said driving means for driving the rotating blade comprises a transmission shaft.

* * * * *